(12) United States Patent
Ziemer et al.

(10) Patent No.: US 10,995,827 B2
(45) Date of Patent: May 4, 2021

(54) MULTISPEED TRANSMISSION

(71) Applicant: ZF Friedrichshafen AG, Friedrichshafen (DE)

(72) Inventors: Peter Ziemer, Tettnang (DE); Kai Bornträger, Langenargen (DE); Christoph Margraf, Markdorf (DE); Andreas Beisswenger, Friedrichshafen (DE); Stefan Brom, Canton, OH (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 25 days.

(21) Appl. No.: 16/348,527

(22) PCT Filed: Nov. 9, 2017

(86) PCT No.: PCT/EP2017/078693
§ 371 (c)(1),
(2) Date: May 9, 2019

(87) PCT Pub. No.: WO2018/087199
PCT Pub. Date: May 17, 2018

(65) Prior Publication Data
US 2019/0293153 A1    Sep. 26, 2019

(30) Foreign Application Priority Data

Nov. 11, 2016  (DE) ............... 10 2016 222 226.0

(51) Int. Cl.
*F16H 3/66*  (2006.01)
*F16H 3/72*  (2006.01)
(Continued)

(52) U.S. Cl.
CPC ............. *F16H 3/66* (2013.01); *B60K 6/365* (2013.01); *B60K 6/48* (2013.01); *B60K 6/547* (2013.01);
(Continued)

(58) Field of Classification Search
CPC ............ F16H 3/66; F16H 2200/0026; F16H 2200/0073; F16H 2200/0078;
(Continued)

(56) References Cited

U.S. PATENT DOCUMENTS 4,004,473 A * 1/1977 Pearce ................... F16H 3/666
475/66
4,205,563 A * 6/1980 Gorrell .................. F16H 3/666
475/276

(Continued)

FOREIGN PATENT DOCUMENTS

DE         199 49 507 A1    4/2001
DE    10 2011 056 897 A1    3/2013
(Continued)

OTHER PUBLICATIONS

German Search Report Corresponding to 10 2016 222 228.7 dated May 8, 2017.

(Continued)

*Primary Examiner* — Tinh Dang
(74) *Attorney, Agent, or Firm* — Davis & Bujold PLLC; Michael J. Bujold

(57) ABSTRACT

A multi-speed transmission has drive and output shafts, three front-mounted and two rear-mounted planetary gear sets, and shift elements which can be engaged to selectively implement at least eleven forward gears and one reverse gear. The front gear sets are connected to one element of the rear gear sets. Five shift elements are assigned to the front gear sets and two are assigned to the rear gear sets, such that the front gear sets transmit seven output speeds to the rear gear sets. If normalized to the input speed of the drive shaft, at least one output speed of the front gear sets is less than 0, (Continued)

one output speed is greater than 1, one output speed is equal to 0, one output speed is equal to 1 and two output speeds are between 0 and 1.

14 Claims, 5 Drawing Sheets

(51) Int. Cl.
  *B60K 6/48* (2007.10)
  *B60K 6/547* (2007.10)
  *B60K 6/365* (2007.10)

(52) U.S. Cl.
  CPC ...... *B60K 2006/4825* (2013.01); *F16H 3/724* (2013.01); *F16H 2200/0026* (2013.01); *F16H 2200/0073* (2013.01); *F16H 2200/0078* (2013.01); *F16H 2200/0086* (2013.01); *F16H 2200/2015* (2013.01); *F16H 2200/2046* (2013.01); *F16H 2200/2048* (2013.01); *F16H 2200/2064* (2013.01); *F16H 2200/2094* (2013.01); *Y02T 10/62* (2013.01)

(58) Field of Classification Search
  CPC ..... F16H 2200/0086; F16H 2200/2015; F16H 2200/2045; F16H 2200/2048; F16H 2200/2064; F16H 2200/202; B60K 6/365; B60K 6/48; B60K 6/547; B60K 2006/4825
  See application file for complete search history.

(56) References Cited

U.S. PATENT DOCUMENTS

| | | | |
|---|---|---|---|
| 4,531,428 A * | 7/1985 | Windish | F16H 3/66 475/279 |
| 6,634,980 B1 | 10/2003 | Ziemer | |
| 6,960,149 B2 * | 11/2005 | Ziemer | F16H 3/66 475/276 |
| 8,083,631 B2 * | 12/2011 | Shiohara | F16H 3/666 475/282 |
| 8,517,885 B2 | 8/2013 | Shim et al. | |
| 9,163,705 B1 | 10/2015 | Hwang et al. | |
| 9,822,856 B2 | 11/2017 | Hoffman | |
| 2016/0109006 A1 * | 4/2016 | Schoolcraft | F16H 37/086 475/185 |

FOREIGN PATENT DOCUMENTS

| | | |
|---|---|---|
| DE | 10 2015 213 067 A1 | 1/2014 |
| DE | 10 2014 214 212 A1 | 1/2015 |
| DE | 20 2015 004 910 U1 | 9/2015 |
| DE | 10 2014 117 679 A1 | 3/2016 |
| EP | 1 373 756 B1 | 4/2012 |
| JP | 2005-172123 A | 6/2005 |
| JP | 2014-224547 A | 12/2014 |
| WO | 02/079669 A1 | 10/2002 |

OTHER PUBLICATIONS

German Search Report Corresponding to 10 2016 222 226.0 dated May 8, 2017.
German Search Report Corresponding to 10 2016 222 222.8 dated May 8, 2017.
International Search Report Corresponding to PCT/EP2017/077061 dated Jan. 29, 2018.
International Search Report Corresponding to PCT/EP2017/078693 dated Jan. 31, 2018.
International Search Report Corresponding to PCT/EP2017/078708 dated Jan. 29, 2018.
Written Opinion Corresponding to PCT/EP2017/077061 dated Jan. 29, 2018.
Written Opinion Corresponding to PCT/EP2017/078693 dated Jan. 31, 2018.
Written Opinion Corresponding to PCT/EP2017/078708 dated Jan. 29, 2018.

* cited by examiner

| Gear | C | B | D | E | A | M | H | Ratio | Gear increment | Difference |
|---|---|---|---|---|---|---|---|---|---|---|
| R2 | o | o | | | | o | | -1.66 | Spreizung 1.-12. | 24.2 |
| R | | o | o | | | o | | -10.50 | Spreizung 2.-12. | 9.8 |
| G1 | o | o | | | | o | | 12.90 | | |
| G2 | | | | o | o | o | | 5.20 | 2.48 | |
| G3 | | o | | o | o | o | | 3.00 | 1.73 | |
| G4 | (o) | | | o | | o | | 1.97 | 1.53 | |
| G5 | | | | | | o | | 1.48 | 1.33 | |
| G6 | o | | | | | o | o | 1.20 | 1.23 | |
| G7 | | | | | | | o | 1.00 | 1.20 | |
| G8 | | o | | o | o | | o | 0.88 | 1.13 | |
| G9 | | | o | o | o | | o | 0.81 | 1.10 | |
| G10 | | o | o | o | | | o | 0.76 | 1.08 | |
| G11 | | o | | | | | o | 0.71 | 1.07 | |
| G12 | o | o | | | | | o | 0.53 | 1.34 | |

Fig. 3

| Gear | C | B | D | E | A | M | H | Ratio | Gear increment |
|---|---|---|---|---|---|---|---|---|---|
| R | | o | o | | | o | | -7.56 | Speizung. 15,1 |
| G1 | | o | | | | o | | 9.52 | 2.06 |
| G2 | | o | | o | o | o | | 4.62 | 1.65 |
| G3 | | | | o | o | o | | 2.80 | 1.40 |
| G4 | o | | | o | | o | | 2.00 | 1.29 |
| G5 | (o) | | | | | o | | 1.55 | 1.28 |
| G6 | o | | | | | o | | 1.21 | 1.21 |
| G7 | | o | | o | | | o | 1.00 | 1.17 |
| G8 | | | | o | | | o | 0.85 | 1.12 |
| G9 | | o | o | | o | | o | 0.77 | 1.10 |
| G10 | | | o | | o | | o | 0.70 | 1.11 |
| G11 | | o | o | | o | | o | 0.63 | |

Fig. 5

MULTISPEED TRANSMISSION

This application is a National Stage completion of PCT/EP2017/078693 filed Nov. 9, 2017, which claims priority from German patent application serial no, 10 2016 222 226.0 filed Nov. 11, 2016.

FIELD OF THE INVENTION

This invention relates to a multi-speed transmission.

BACKGROUND OF THE INVENTION

For instance, from document EP 1 373 756 B1, a multi-speed transmission is known as an automatic transmission, in which, for instance, two front-mounted gear sets and two rear-mounted gear sets are provided, to which seven shift elements are assigned, wherein at most eleven forward gears and one reverse gear can be achieved, however. A connecting shaft is used to permanently connect the front-mounted gear sets to the rear-mounted gear sets. Further, the rear-mounted gear sets can be connected to the drive shaft via a shaft and a clutch as shift elements and can be grounded via a further shaft and a brake as further shift elements, such that the two rear-mounted gear sets simultaneously transfer torque in at least three of the forward gears. In the known gears, any high-precision optimization of the gear spacings is possible only to a limited extent. In addition, acoustic problems may arise. Further, in the known gear set, additional gears cannot be implemented without considerable design effort.

SUMMARY OF THE INVENTION

This invention addresses the problem of providing a multi-speed transmission of the type described above, having a design that is structurally as simple as possible and a number of gears that can be augmented.

According to the invention, this problem is solved by the features of the independent claims, wherein advantageous embodiments are presented in the subclaims, the description and the drawings.

Thus, a multi-speed transmission is proposed for instance as an automatic transmission, in particular for vehicles, which transmission has a drive shaft and an output shaft and a first front-mounted gear set, a second front-mounted gear set and a third front-mounted gear set. Further, a first rear-mounted gear set and a second rear-mounted gear set are provided as main transmission. The front-mounted gear sets and the rear-mounted gear sets are each designed as planetary gear sets. Moreover, seven shift elements are provided, the selective engaging of which can be used to transmit a drive speed of the drive shaft and output speeds generated in the front-mounted gear sets selectively for achieving at least eleven forward gears and at least one reverse gear to the output shaft as output speed via at least one of the rear-mounted gear sets. The front-mounted gear sets are rigidly tied to an element of the rear-mounted gear sets. Further, provision is made that five shift elements are assigned to the three front-mounted gear sets and two shift elements are assigned to the two rear-mounted gear sets such that seven different output speeds of the front-mounted gear sets can be transmitted to at least one of the rear-mounted gear sets, wherein normalized or correlated to the input speed of the drive shaft at least one output speed of the front-mounted gear sets is less than 0, at least one output speed is greater than 1, one output speed is equal to 0, one output speed is equal to 1 and at least one output speed is between 0 and 1.

As a result, high-precision optimization with respect to the gear spacing can be readily achieved in the proposed multi-speed transmission. Further, a multi-speed transmission having a structurally simpler design results, wherein at least eleven forward gears and at least one reverse gear are provided. Here, for example, a particularly short and a particularly tall gear can be implemented, although the number of single gear sets is 5 at most and the number of shift elements is 7 at most.

A preferred variant of the embodiment of this invention may provide that among the output speeds of the front-mounted gear sets two of the output speeds<0, one output speed>1, one output speed is equal to 0, one output speed is equal to 1 and two output speeds are between 0 and 1. In this embodiment of the multi-speed transmission according to the invention there is the additional advantage that an additional forward gear and an additional reverse gear can be realized without increasing construction cost.

Preferably, in the multi-speed transmission according to the invention, only three of the shift elements are designed as clutches and four shift elements are designed as brakes. This results in a further advantage where installation space and manufacturing cost is concerned, as the design of brakes is much simpler than that of clutches.

Because the three front-mounted gear sets are preferably designed as 3-carrier 5-shaft gears or arrangements, the complexity of the design is further simplified. In a 3-carrier 5-shaft gear provision is made that four couplings are provided between the gear sets, resulting in only five shafts being present instead of the customary nine shafts.

A further structural simplification of the design of the front-mounted gear sets can be achieved in combining identical elements of the front-mounted gear sets, e.g. carriers, and designing them as joint components. Furthermore, incremental planetary gears or axially elongated planetary gears can be used in the planetary gear sets.

Regarding the rear-mounted gear sets, two single gear sets are shown. According to one possible variant, provision can be made in the proposed multi-speed transmission that the two rear-mounted gear sets are designed as 2-carrier 4-shaft gears, e.g. in the form of a Simpson gear set. In a 2-carrier 4-shaft gear or arrangement provision is made that in every case two elements of the two gear sets are connected to each other, resulting in only four shafts being required instead of the customary six shafts. There, two shift elements are assigned to the rear-mounted gear sets. As a result, the design of the proposed multi-speed transmission is further simplified and the overall manufacturing costs are further reduced. However, it is conceivable that the proposed 2-carrier 4-shaft gear arrangement is dissolved by an altered assignment of a shift element.

This multi-speed transmission according to the invention can generally be used in vehicles. One preferred application may provide that the multi-speed transmission is used in vehicles, such as commercial vehicles or the like, which require a particularly short first gear as a creep mode and in addition a tall gear as an overdrive. The high-precision optimization of the gear spacing also results in a particularly good driving efficiency of the proposed transmission.

BRIEF DESCRIPTION OF THE DRAWINGS

Below, this invention is explained with reference to the drawings. In the Figures:

FIG. 3 shows a shift diagram for the gear sets shown in FIGS. 1 and 2 by way of example;

FIG. 5 shows a shift diagram for the gear set shown in FIG. 4 by way of example.

DETAILED DESCRIPTION OF THE PREFERRED EMBODIMENTS

In FIGS. 1 to 5, gear set diagrams of a multi-speed transmission of a vehicle having, for instance, eleven or twelve forward gears G1 to G12 and having at least one or two reverse gears R or R2 are shown by way of example, wherein FIG. 3 and FIG. 5 each show a possible shift matrix or a possible shift diagram as an example for gear set diagrams.

Figure 2:
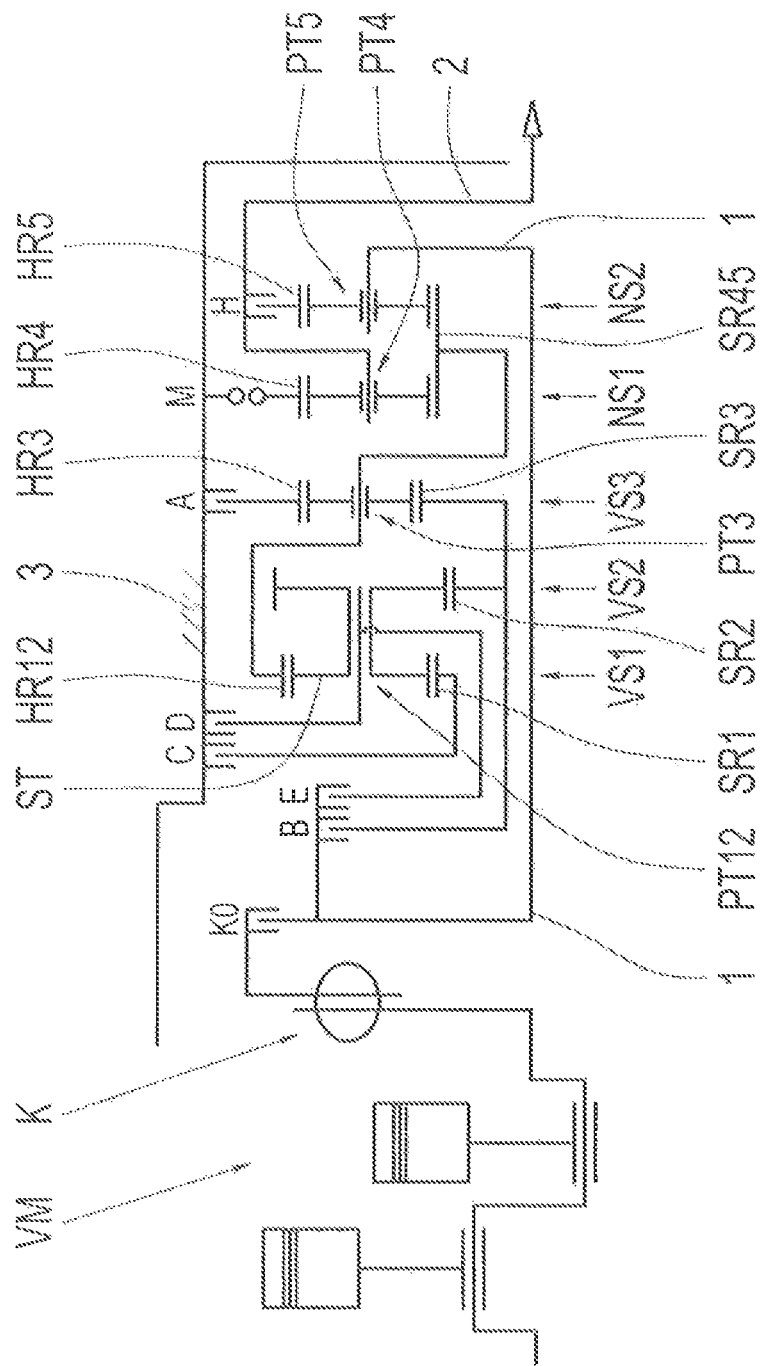
FIG. 2 shows a schematic view of a second variant of the embodiment of the multi-speed transmission.

The multi-speed transmission designed as an automatic transmission comprises a drive shaft 1 and an output shaft 2, wherein the drive shaft 1 can preferably be coupled to a drive motor of the vehicle, for instance an internal combustion engine VM or the like, via a torque converter 4 as shown by way of example in the figures. In FIG. 2, the connection of the internal combustion engine VM and multi-speed transmission is implemented using torsion damper K and clutch KU. The gear set shown in FIG. 4 also has the torsional damper K and clutch KU for the connection of the internal combustion engine VM and drive shaft 1, wherein in this embodiment, an electric machine EM is also coupled to the drive shaft 1. In this way, a hybrid variant is shown by way of example in FIG. 4. The coupling possibilities and drive options shown are merely exemplary and can be combined with each other in any way.

Irrespective of the respective variants of the embodiment, a first front-mounted gear set VS1, a second front-mounted gear set VS2 and a third front-mounted gear set VS3 and a first rear-mounted gear set NS1 and a second rear-mounted gear set NS2 are also provided in the multi-speed transmission, which are each designed as planetary gear sets. Moreover, seven shift elements A, B, C, D, E, M, H are provided, the selective engaging of which selectively renders a drive speed of the drive shaft 1 and output speeds generated in the front-mounted gear sets VS1, VS2, VS3 for achieving at least eleven or twelve forward gears G1 to G12 and at least one or more reverse gears R, R2 via at least one of the rear-mounted gear sets NS1, NS2 transmissible as the output speed to the output shaft 2.

The multi-speed transmission according to the invention provides that five shift elements A, B, C, D, E are assigned to the front-mounted gear sets VS1, VS2, VS3, wherein two shift elements M, H are assigned to the two rear-mounted gear sets NS1, NS2, and wherein the front-mounted gear sets VS1, VS2 and VS3 are rigidly tied to an element of the rear-mounted gear sets NS1, NS2, such that seven different output speeds of the front-mounted gear sets VS1, VS2, VS3 can be transmitted to at least one of the rear-mounted gear sets NS1, NS2. The output speeds of the front-mounted gear sets VS1, VS2, VS3 are normalized or correlated to the input speed of the drive shaft 1. Two of the output speeds are less than 0. One output speed is greater than 1, while another output speed is equal to 0. Furthermore, another output speed is equal to 1 and two other output speeds are between 0 and 1.

At a value of 1, the output speed equals the drive speed. A front-mounted reduction gear set accordingly provides a normalized speed between 0 and 1. A front-mounted overdrive gear set accordingly provides a normalized speed greater than 1. A front-mounted reversing gear set accordingly provides a normalized speed less than 0.

In a variant of the embodiment not further shown, provision can be made for generating a further forward gear in only one reverse gear, that an output speed is less than 0, another output speed is equal to 0, one output speed is equal to 1 and two output speeds are between 0 and 1, wherein two more output speeds are greater than 1.

Irrespective of the various variants of the embodiment, provision is made in the proposed multi-speed transmission that a first shift element A is assigned as a brake, a second shift element B is assigned as a clutch, a third shift element C is assigned as a brake and a fourth shift element D is assigned as a brake and a fifth shift element is assigned as a clutch to the front-mounted gear sets VS1, VS2, VS3, and that a sixth shift element M is assigned as a brake and a seventh shift element H is assigned as a clutch to the rear-mounted gear sets NS1, NS2. Further, provision is made that the three front-mounted gear sets VS1, VS2, VS3 are designed as 3-carrier 5-shaft gears.

Figure 1:
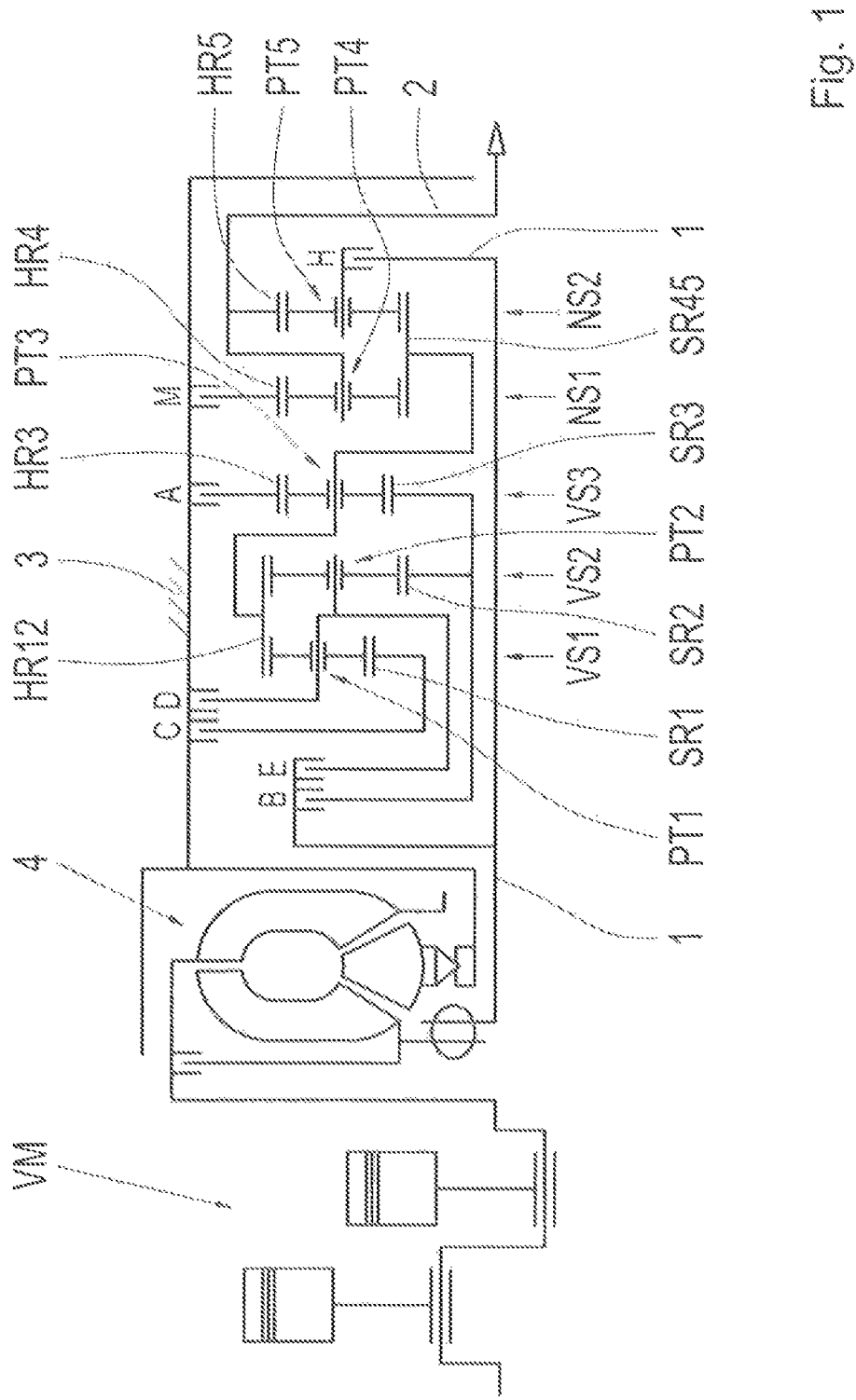
FIG. 1 shows a schematic view of a first variant of the embodiment of a multi-speed transmission according to the invention.

In the first variant of the embodiment shown in FIG. 1, provision is made in detail that the drive shaft 1 is connected to a sun gear SR2 of the second front-mounted gear set VS2 and to a sun gear SR3 of the first front-mounted gear set VS3 when the second shift element B is engaged. The drive shaft 1 is connected to a planetary gear carrier PT1 of the first front-mounted gear set VS1 and to a planetary gear carrier PT2 of the second front-mounted gear set VS2 when the shift element E is engaged, wherein the two planetary gear carriers PT1, PT2 are connected to a housing 3 when the fourth shift element D is engaged. Further, the drive shaft 1 is connected to a planetary gear carrier PT5 of the second front-mounted gear set NS2 when the seventh shift element H is engaged. A sun gear SR1 of the first front-mounted gear set VS1 is connected to the housing 3 of the transmission when the third shift element C is engaged. A joint ring gear HR12 of the first front-mounted gear set VS1 and the second front-mounted gear set VS2 is connected to a planetary gear carrier PT3 of the third front-mounted gear set VS3 and to a joint sun gear SR45 of the first rear-mounted gear set NS1 and the second rear-mounted gear set NS2. In addition, a ring gear HR3 of the third front-mounted gear set VS3 is connected to the housing 3 when the first shift element A is engaged and a ring gear HR4 of the first rear front-mounted gear set NS1 is connected to the housing 3 when the sixth shift element M is engaged. Finally, a planetary gear carrier PT4 of the first rear-mounted gear set NS1 is connected to a ring gear HR5 of the second rear-mounted gear set NS2 and to the output shaft 2.

Thus, in the first variant of the embodiment, a 3-carrier 5-shaft transmission results as front-mounted gear sets VS1, VS2, and VS3, wherein single planetary gears are provided in every case. With the gear set diagram shown in FIG. 3, for example, 12 forward gears G1 to G12 and two reverse gears R, R2 result.

FIG. 2 shows a second variant of the embodiment of the multi-speed transmission, in which provision is made in detail that a drive shaft 1 is connected to a sun gear SR2 of the second front-mounted gear set VS2 and a sun gear SR3 of the third front-mounted gear set VS3 when the second shift element B is engaged. Further, the drive shaft 1 is connected to a joint planetary gear carrier PT12 of the first planetary gear set VS1 and of the second front-mounted gear set VS2 when the shift element E is engaged, wherein the joint planetary gear carrier PT12 is connected to a housing 3 when the fourth shift element D is engaged. The drive shaft 1 is also connected to a planetary gear carrier PT5 of the second rear-mounted gear set NS2, A sun gear SR1 of the first front-mounted gear set VS1 is connected to the housing 3 when the third shift element C is engaged. A joint ring gear HR12 of the first front-mounted gear set VS1 and the second front-mounted gear set VS2 is connected to a planetary gear carrier PT3 of the third front-mounted gear set VS3 and to a joint sun gear SR45 of the first front-mounted gear set NS1 and of the second front-mounted gear set NS2. Further, a ring gear HR3 of the third front-mounted gear set VS3 is connected to the housing 3 when the first shift element A is engaged, and a ring gear HR4 of the first rear-mounted gear set NS1 is connected to the housing 3 when the sixth shift element M is engaged. Finally, a planetary gear carrier P14 of the first rear-mounted gear set NS1 is connected to the output shaft 2, wherein the planetary gear carrier PT4 of the first rear-mounted gear set NS1 and the output shaft 2 are connected to a ring gear HR5 of the second rear-mounted gear set NS2 when the seventh shift element H is engaged.

In the second variant of the embodiment, the front-mounted gear sets VS1, VS2, VS3 are also designed as 3-carrier 5-shaft gears, wherein in contrast to the first variant of the embodiment, a stepped planetary gear ST having different diameters is provided for the first two front-mounted gear sets VS1, VS2. This results in a reduced complexity of design. In contrast to the first variant of the embodiment, the two rear-mounted gear sets NS1, NS2 are not designed as 2-carrier 4-shaft gears, because the planetary gear carrier PT4 of the first rear-mounted gear set NS1 is not fixed, but connected to the ring gear HR5 of the second rear-mounted gear set NS2 via the seventh shift element H. Just as in the first variant of the embodiment, 12 forward gears G1 to G12 and two reverse gears R2, R also result in the second embodiment.

Figure 4:
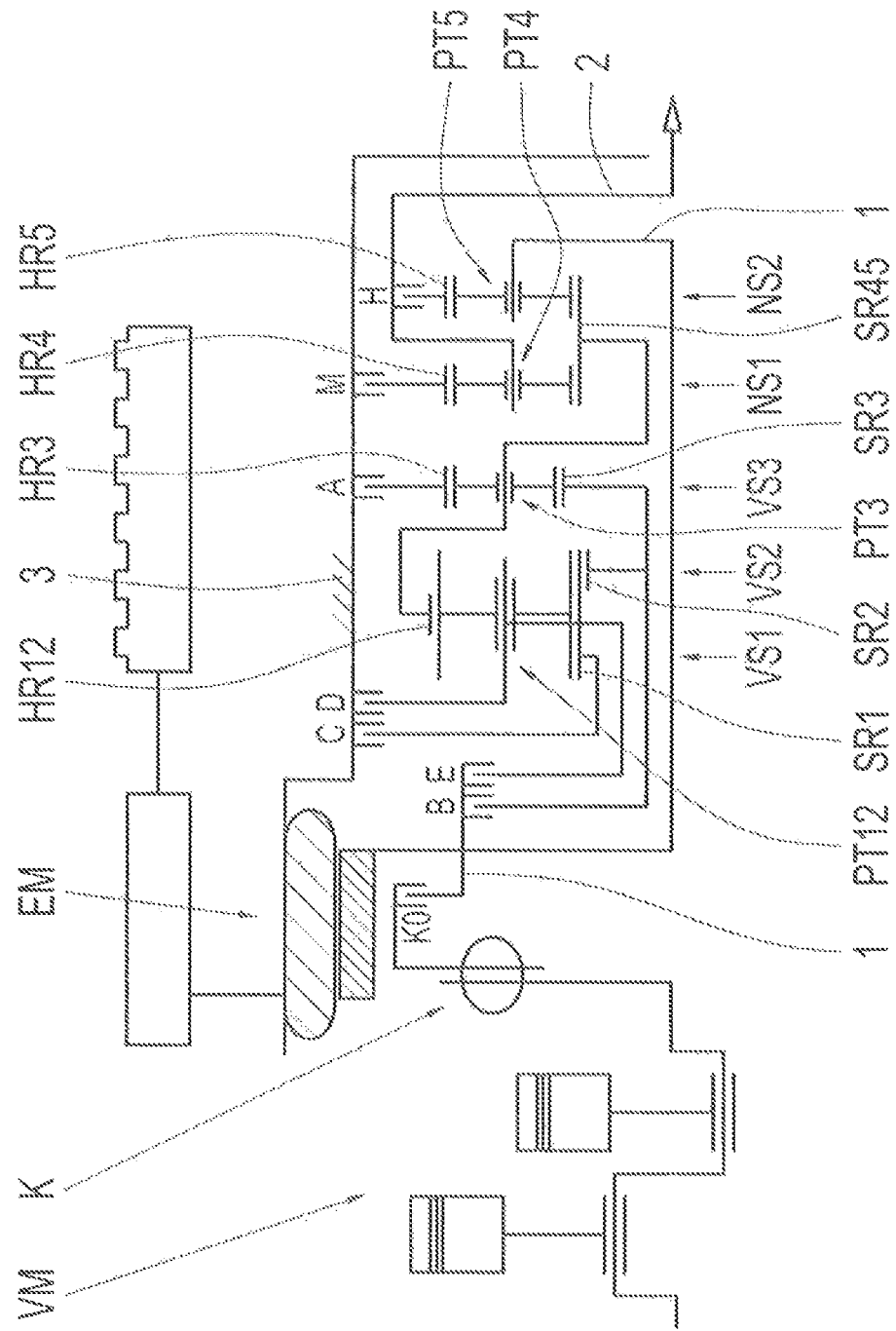
FIG. 4 shows a schematic view of a third variant of the embodiment of a multi-speed transmission according to the invention.

In FIG. 4, a third variant of the embodiment is shown by way of example, wherein with respect to the connections of the individual elements between the front-mounted gear sets VS1, VS2, VS3 and the rear-mounted gear sets NS1, NS2 there are no differences from the second variant of the embodiment described in FIG. 2. In contrast to the second variant of the embodiment, the third variant of the embodiment is designed having an axially elongated or axially long planetary gear set at the first two front-mounted gear sets VS1, VS2, such that the two sun gears SR1 and SR2 meshing with this long planetary gear have different numbers of teeth, resulting in different stand ratios and achieving an increase in the variation in the gear spacing and an acoustic improvement without increasing the complexity of construction.

FIG. 3 shows a shift diagram for the gear sets shown in FIGS. 1 and 2 by way of example, while FIG. 5 shows a shift diagram for the wheel set shown in FIG. 4 by way of example. The different shift diagrams differ only in terms of the number of gears and the specified ratios and gear increments.

In detail, the shift diagrams shown in FIGS. 3 and 5 show by way of example that the second shift element B, the first shift element A and the sixth shift element M are engaged to achieve a first forward gear G1. For achieving a second forward gear G2, the fifth shift element E, the first shift element A and the sixth shift element M are engaged. For achieving a third forward gear G3, the second shift element B, the fifth shift element E and the sixth shift element M are engaged. For achieving a fourth forward gear G4, the third shift element C, the fifth shift element E and the sixth shift element M are engaged. For achieving a fifth forward gear G5, the sixth shift element M, the seventh shift element H and preferably the third shift element C are engaged. For achieving a sixth forward gear G6, the third shift element C, the fifth shift element E and the seventh shift element H are engaged. For achieving a seventh forward gear G7, the second shift element B, the fifth shift element E and the seventh shift element H are engaged. For achieving an eighth forward gear G8, the fifth shift element E, the first shift element A and the seventh shift element H are engaged. For achieving a ninth forward gear G9, the second shift element B, the first shift element A and the seventh shift element H are engaged. For achieving a tenth forward gear G10, the fourth shift element D, the first shift element A and the seventh shift element H are engaged and for achieving an eleventh forward gear G11, the second shift element B, the fourth shift element D and the seventh shift element H are engaged. Further, provision is made that for achieving a reverse gear R, the second shift element B, the fourth shift element D and the sixth shift element M are engaged.

In addition, the shift diagram shown in FIG. 3 shows that the third shift element C, the second shift element B and the seventh shift element H are engaged for achieving a twelfth forward gear G12, and that for achieving a further reverse gear R2, the third shift element C, the second shift element B and the sixth shift element M are engaged.

Accordingly, in the proposed transmission system according to FIGS. 1 and 2, twelve forward gears or eleven forward gears and in addition one creep mode can be implemented.

Regardless of the respective variants of the embodiment, any three of the shift elements A, B, C, D, E, M, H are engaged for achieving gear, wherein in fifth gear preferably the third shift element C is engaged, besides the engaged sixth shift element M and seventh shift element H.

REFERENCE NUMERALS 1 drive shaft
2 output shaft
3 housing
4 torque converter
EM electric machine
VM internal combustion engine
torsion damper
K0 clutch between drive shaft and drive machine
VS1 first front-mounted gear set
VS2 second front-mounted gear set
VS3 third front-mounted gear set
NS1 first rear-mounted gear set
NS2 second rear-mounted gear set
G1 first forward gear
G2 second forward gear
G3 third forward gear
G4 fourth forward gear
G5 fifth forward gear
G6 sixth forward gear
G7 seventh forward gear
G8 eighth forward gear
G9 ninth forward gear
G10 tenth forward gear
G11 eleventh forward gear
G12 twelfth forward gear
R reverse gear R2 further reverse gear
A first shift element as a brake
B second shift element as a clutch
C third shift element as a clutch
D fourth shift element as a brake
E fifth shift element as a clutch
M sixth shift element as a brake
H seventh shift element as a clutch
SR1 sun gear of the first front-mounted gear set
PT1 planetary gear carrier of the first front-mounted gear set
HR12 joint ring gear of the first and second front-mounted gear set
SR2 sun gear of the second front-mounted gear set
T2 planetary gear carrier of the second front-mounted gear set
SR3 sun gear of the third front-mounted gear set
SR3 planetary gear carrier of the third front-mounted gear set
HR3 ring gear of the third front-mounted gear set
SR45 joint sun gear of the first and second rear-mounted gear set
PT4 planetary gear carrier of the first rear-mounted gear set
HR4 ring gear of the first rear-mounted gear set
PT5 planetary gear carrier of the second rear-mounted gear set
HR5 ring gear of the second rear-mounted gear set
ST stepped planetary gear
PT12 joint planetary gear carrier of the first and second front-mounted gear set

The invention claimed is:

1. A multi-speed transmission comprising:
a drive shaft;
an output shaft;
a housing;
front-mounted gear sets comprising first, second, and third front-mounted gear sets, and rear-mounted gear sets comprising first and second rear-mounted gear sets, each of the front-mounted gear sets and the rear-mounted gear sets being designed as a planetary gear set and having a planetary gear carrier with at least one planetary gear, a sun gear and a ring gear;
first, second, third, fourth, fifth, sixth and seventh shift elements, selective engagement of the first, the second, the third, the fourth, the fifth, the sixth and the seventh shift elements selectively rendering a drive speed of the drive shaft and speeds generated in the front-mounted gear sets for achieving at least eleven forward gears and at least one reverse gear via at least one of the first and the second rear-mounted gear sets transmissible as an output speed to the output shaft;
one of the first, the second, and the third front-mounted gear sets being rigidly connected to an element of the rear-mounted gear sets;
the first, the second, the third, the fourth, and the fifth shift elements being assigned to the front-mounted gear sets and the sixth and the seventh shift elements being assigned to the rear-mounted gear sets, resulting in seven different output speeds of the front-mounted gear sets being transmissible to at least one of the first and second rear-mounted gear sets; and
if normalized to the input speed of the drive shaft, at least one output speed of the front-mounted gear sets is less than 0, one output speed of the front-mounted gear sets is greater than 1, one output speed of the front-mounted gear sets is equal to 0, one output speed of the front-mounted gear sets is equal to 1 and two output speeds of the front-mounted gear sets are between 0 and 1;

the first, the third and the fourth shift elements are brakes, and the second and the fifth shift elements are clutches; and
the sixth shift element is a brake and the seventh shift element is a clutch.

2. The multi-speed transmission according to claim 1, wherein two of the output speeds of the front-mounted gear sets are less than 0, one output speed greater than 1, one output speed is equal to 0, one output speed is equal to 1 and two output speeds are between 0 and 1.

3. The multi-speed transmission according to claim 1, wherein the front-mounted gear sets are designed as 3-carrier 5-shaft gears.

4. A multi-speed transmission comprising:
a drive shaft;
an output shaft;
a housing;
front-mounted gear sets comprising first, second, and third front-mounted gear sets, and rear-mounted gear sets comprising first and second rear-mounted gear sets, each of the front-mounted gear sets and the rear-mounted gear sets being designed as a planetary gear set and having a planetary gear carrier with at least one planetary gear, a sun gear and a ring gear;
first, second, third, fourth, fifth, sixth and seventh shift elements, selective engagement of the first, the second, the third, the fourth, the fifth, the sixth and the seventh shift elements selectively rendering a drive speed of the drive shaft and speeds generated in the front-mounted gear sets for achieving at least eleven forward gears and at least one reverse gear via at least one of the first and the second rear-mounted gear sets transmissible as an output speed to the output shaft;
one of the first, the second, and the third front-mounted gear sets being rigidly connected to an element of the rear-mounted gear sets;
the first, the second, the third, the fourth, and the fifth shift elements being assigned to the front-mounted gear sets and the sixth and the seventh shift elements being assigned to the rear-mounted gear sets, resulting in seven different output speeds of the front-mounted gear sets being transmissible to at least one of the first and second rear-mounted gear sets;
if normalized to the input speed of the drive shaft, at least one output speed of the front-mounted gear sets is less than 0, one output speed of the front-mounted gear sets is greater than 1, one output speed of the front-mounted gear sets is equal to 0, one output speed of the front-mounted gear sets is equal to 1 and two output speeds of the front-mounted gear sets are between 0 and 1; and
the first front-mounted gear set and the second front-mounted gear set have a joint ring gear.

5. A multi-speed transmission comprising:
a drive shaft;
an output shaft;
a housing;
front-mounted gear sets comprising first, second, and third front-mounted gear sets, and rear-mounted gear sets comprising first and second rear-mounted gear sets, each of the front-mounted gear sets and the rear-mounted gear sets being designed as a planetary gear set and having a planetary gear carrier with at least one planetary gear, a sun gear and a ring gear;
first, second, third, fourth, fifth, sixth and seventh shift elements, selective engagement of the first, the second, the third, the fourth, the fifth, the sixth and the seventh shift elements selectively rendering a drive speed of the drive shaft and speeds generated in the front-mounted gear sets for achieving at least eleven forward gears and at least one reverse gear via at least one of the first and the second rear-mounted gear sets transmissible as an output speed to the output shaft;

one of the first, the second, and the third front-mounted gear sets being rigidly connected to an element of the rear-mounted gear sets;

the first, the second, the third, the fourth, and the fifth shift elements being assigned to the front-mounted gear sets and the sixth and the seventh shift elements being assigned to the rear-mounted gear sets, resulting in seven different output speeds of the front-mounted gear sets being transmissible to at least one of the first and second rear-mounted gear sets;

if normalized to the input speed of the drive shaft, at least one output speed of the front-mounted gear sets is less than 0, one output speed of the front-mounted gear sets is greater than 1, one output speed of the front-mounted gear sets is equal to 0, one output speed of the front-mounted gear sets is equal to 1 and two output speeds of the front-mounted gear sets are between 0 and 1; and the first front-mounted gear set and the second front-mounted gear set have a joint stepped planetary gear.

6. The multi-speed transmission according to claim 1, wherein the first front-mounted gear set and the second front-mounted gear set have an axially elongated planetary gear.

7. The multi-speed transmission according to claim 1, wherein the first rear-mounted gear set and the second rear-mounted gear set are designed as 2-carrier 4-shaft gears.

8. The multi-speed transmission according to claim 1, wherein the first rear-mounted gear set and the second rear-mounted gear set are designed as Simpson gear sets.

9. The multi-speed transmission according to claim 1, wherein when the second shift element is engaged, the drive shaft is connected to the sun gear of the second front-mounted gear set and to the sun gear of the third front-mounted gear set;

when the fifth shift element is engaged, the drive shaft is connected to the planetary gear carrier of the first front-mounted gear set and to the planetary gear carrier of the second front-mounted gear set;

when the fourth shift element is engaged, the planetary gear carrier of the first front-mounted gear set and the planetary gear carrier of the second front-mounted gear set are connected to the housing;

when the seventh shift element is engaged, the drive shaft is connected to the planetary carrier of the second rear-mounted gear set;

when the third shift element is engaged, the sun gear of the first front-mounted gear set is connected to the housing;

the ring gears of the first and the second front-mounted gear sets form a common ring gear, and the sun gears of the first and the second rear-mounted gear sets form a common sun gear, and the common ring gear is connected to the planetary gear carrier of the third front-mounted gear set and to the common sun gear;

when the first shift element is engaged, the ring gear of the third front-mounted gear set is connected to the housing;

when the sixth shift element is engaged, the ring gear of the first rear-mounted gear set is connected to the housing ; and the planetary gear carrier of the first rear-mounted gear set is connected to the ring gear of the second rear-mounted gear set and to the output shaft.

10. The multi-speed transmission according to claim 1, wherein when the second shift element is engaged, the drive shaft is connected to the sun gear of the second front-mounted gear set and to the sun gear of the third front-mounted gear set;

the planetary gear carriers of the first and the second front-mounted gear sets form a common planetary carrier that is connected to the drive shaft, when the fifth shift element is engaged;

when the fourth shift element is engaged, the common planetary gear carrier is connected to the housing;

the drive shaft is connected to the planetary gear carrier of the second rear-mounted gear set;

when the third shift element is engaged, the sun gear of the first front-mounted gear set is connected to the housing;

the ring gears of the first and the second front-mounted gear sets form a common ring gear, the sun gears of the first and the second rear-mounted gear sets form a common sun gear, and the planetary gear carrier of the third front-mounted gear set is connected to the common ring gear and to the common sun gear;

when the first shift element is engaged, the ring gear of the third front-mounted gear set is connected to the housing;

when the sixth shift element is engaged, the ring gear of the first rear-mounted gear set is connected to the housing;

the planetary gear carrier of the first rear-mounted gear set is connected to the output shaft; and when the seventh shift element is engaged, the planetary gear carrier of the first rear-mounted gear set and the output shaft are connected to the ring gear of the second rear-mounted gear set.

11. The multi-speed transmission according to claim 1, wherein a first forward gear is implemented by engagement of the second shift element, the first shift element and the sixth shift element;

a second forward gear is implemented by engagement of the fifth shift element, the first shift element and the sixth shift element;

a third forward gear is implemented by engagement of the second shift element, the fifth shift element and the sixth shift element;

a fourth forward gear is implemented by engagement of the third shift element, the fifth shift element and the sixth shift element;

a fifth forward gear is implemented by engagement of the third shift element, the sixth shift element and the seventh shift element;

a sixth forward gear is implemented by engagement of the third shift element, the fifth shift element and the seventh shift element;

a seventh forward gear is implemented by engagement of the second shift element, the fifth shift element and the seventh shift element;

an eighth forward gear is implemented by engagement of the fifth shift element, the first shift element and the seventh shift element;

a ninth forward gear is implemented by engagement of the second shift element, the first shift element and the seventh shift element;

a tenth forward gear is implemented by engagement of the fourth shift element, the first shift element and the seventh shift element; and an eleventh forward gear is implemented by engagement of the second shift element, the fourth shift element, and the seventh shift element.

12. The multi-speed transmission according to claim 1, wherein a twelfth forward gear is implemented by engagement of the third shift element, the second shift element and the seventh shift element.

13. The multi-speed transmission according to claim 1, wherein a reverse gear is implemented by engagement of the second shift element, the fourth shift element and the sixth shift element.

14. The multi-speed transmission according to claim 1, wherein a reverse gear is implemented by engagement of the third shift element, the second shift element and the sixth shift element.

\* \* \* \* \*